United States Patent
Court et al.

(10) Patent No.: US 10,069,388 B2
(45) Date of Patent: *Sep. 4, 2018

(54) STATOR-PLATE OVERMOULDING

(71) Applicant: Yasa Motors Limited, Abingdon, Oxfordshire (GB)

(72) Inventors: Andrew Lee Court, Bicester (GB); Jon Barker, Oxford (GB); Charles Edmund King, Oxford (GB); Mark Stephen Ewart East, Hungerford (GB); Jonathan James Biddulph, Wallingford (GB); Timothy James Thursby Woolmer, Wheatley (GB)

(73) Assignee: YASA LIMITED, Kidlington (GB)

( * ) Notice: Subject to any disclaimer, the term of this patent is extended or adjusted under 35 U.S.C. 154(b) by 260 days.

This patent is subject to a terminal disclaimer.

(21) Appl. No.: 15/021,203

(22) PCT Filed: Sep. 12, 2014

(86) PCT No.: PCT/GB2014/052775
§ 371 (c)(1),
(2) Date: Mar. 10, 2016

(87) PCT Pub. No.: WO2015/036780
PCT Pub. Date: Mar. 19, 2015

(65) Prior Publication Data
US 2016/0226353 A1    Aug. 4, 2016

(30) Foreign Application Priority Data
Sep. 13, 2013   (GB) .................................. 1316336.5

(51) Int. Cl.
*H02K 15/12* (2006.01)
*B29C 45/14* (2006.01)
(Continued)

(52) U.S. Cl.
CPC ......... *H02K 15/12* (2013.01); *B29C 45/1418* (2013.01); *B29C 45/14467* (2013.01);
(Continued)

(58) Field of Classification Search
CPC ... H02K 15/12; H02K 15/128; H02K 15/1282
(Continued)

(56) References Cited

U.S. PATENT DOCUMENTS 6,492,749 B1    12/2002  Shiga et al.
7,078,843 B2    7/2006   Smith et al.
(Continued)

FOREIGN PATENT DOCUMENTS

| EP | 2040352 A1 | 3/2009 |
|---|---|---|
| GB | 2468018 A | 8/2010 |
| GB | 2482928 | 2/2012 |

OTHER PUBLICATIONS

International Search Report and Written Opinion, dated Jun. 12, 2015, in International Patent Application No. PCT/GB2014/052775.
(Continued)

*Primary Examiner* — Timothy Kennedy
(74) *Attorney, Agent, or Firm* — Meunier Carlin & Curfman LLC

(57) ABSTRACT

We describe a method of manufacturing a housing for the stator of an axial flux permanent magnet machine, the machine having a stator comprising a set of coils wound on respective stator bars and disposed circumferentially at intervals about an axis of the machine, and a rotor bearing a set of permanent magnets and mounted for rotation about said axis, and wherein said rotor and stator are spaced apart along said axis to define a gap therebetween in which magnetic flux in the machine is generally in an axial direction, the method comprising: fabricating a radial wall
(Continued)

for said stator housing to be located in said gap between said rotor and said stator by: placing a resin membrane into a mold of an injection molding machine; injection molding a set of reinforcing features onto said membrane using a thermoplastic polymer bondable when molten with said resin; and manufacturing said housing using said radial wall.

20 Claims, 7 Drawing Sheets

(51) Int. Cl.
    *H02K 5/128*     (2006.01)
    *H02K 15/03*     (2006.01)
    *H02K 21/24*     (2006.01)
    *B29L 31/34*     (2006.01)
    *B29K 105/12*     (2006.01)
    *B29K 101/12*     (2006.01)

(52) U.S. Cl.
    CPC .. *B29C 45/14491* (2013.01); *B29C 45/14778* (2013.01); *H02K 5/1282* (2013.01); *H02K 15/03* (2013.01); *H02K 21/24* (2013.01); *B29K 2101/12* (2013.01); *B29K 2105/12* (2013.01); *B29L 2031/34* (2013.01); *B29L 2031/3481* (2013.01)

(58) Field of Classification Search
    USPC .......................................... 264/272.19, 272.2
    See application file for complete search history.

(56) References Cited

U.S. PATENT DOCUMENTS

| | | |
|---|---|---|
| 2001/0028128 A1 | 10/2001 | Blanchon et al. |
| 2008/0292858 A1 | 11/2008 | Dajek et al. |
| 2009/0001843 A1 | 1/2009 | Enomoto et al. |
| 2013/0020900 A1 | 1/2013 | Takeuchi et al. |
| 2013/0062973 A1 | 3/2013 | Yoshimura et al. |
| 2013/0147291 A1 | 6/2013 | Woolmer et al. |
| 2016/0377082 A1 | 12/2016 | Fecke et al. |

OTHER PUBLICATIONS

Combined Search and Examination Report in related application GB 1316338.1, dated Apr. 16, 2014.
International Search Report and Written Opinion in PCT/GB2014/052774, dated Apr. 28, 2015.
Non-Final Office Action issued in U.S. Appl. No. 15/021,208, dated Jan. 9, 2018.
English Translation of First Office Action in related CN Application No. 2014800502858, dated Dec. 1, 2017.

Torus NS    Torus NN    YASA

STATOR-PLATE OVERMOULDING

FIELD OF THE INVENTION

This invention relates to methods of manufacturing a housing for the stator of an axial flux permanent magnet machine using injection moulding; and to housings manufactured by the methods; and to machines incorporating the housings.

BACKGROUND TO THE INVENTION

In this specification we are concerned with axial flux permanent magnet machines. Broadly speaking these have disc- or ring-shaped rotor and stator structures arranged about an axis. Typically the stator comprises a set of coils each parallel to the axis and the rotor bears a set of permanent magnets and is mounted on a bearing so that it can rotate about the axis driven by fields from the stator coils. FIG. 1a shows the general configuration of an axial flux machine with a pair of rotors R1, R2 to either side of a stator S—although a simple structure could omit one of the rotors. As can be seen there is an air gap G between a rotor and a stator and in an axial flux machine the direction of flux through the air gap is substantially axial.

There are various configurations of axial flux permanent magnet machine depending upon the arrangement of north and south poles on the rotors. FIG. 1b illustrates the basic configurations of a Torus NS machine, a Torus NN machine (which has a thicker yoke because the NN pole arrangement requires flux to flow through the thickness of the yoke), and a YASA (Yokeless and Segmented Armature) topology. The illustration of the YASA topology shows cross-sections through two coils, the cross-hatched area showing the windings around each coil. As can be appreciated, dispensing with the stator yoke provides a substantial saving in weight and iron losses, but drawbacks of removing the stator yoke are a) loss of the structural strength to the stator (which the iron provided) even though there is potentially increased need for strength because of the YASA topology which, being a compact design, can result in very large stresses and b) loss of a route for heat to escape from stator coils. To address both issues, i.e. the high torque density of the YASA design and generation of significant quantities of heat, a housing for the stator should provide great strength and rigidity to address torque demands and should also define a chamber which can be supplied with coolant for the machine. It can further be appreciated from FIG. 1b that for efficient operation (minimum losses in the high reluctance air gap) the gap between the rotor and stator should be as small as possible.

The desired features of a housing for the stator assembly of an axial flux permanent magnet machine, especially one having a YASA topology, impose conflicting requirements. Conventional manufacturing techniques are not able to combine the desired features adequately. General background prior art relating to the production of reinforced articles can be found in, for example, EP0 063 403A; US2001/0028128; and US2008/0292858. We have previously described, in WO2012/022974, a clamshell type housing in which shoes of the stator bars on which the stator coils are wound are over moulded into the radial wall of the housing. However in practice it has proved difficult to form such a strong structure whilst at the same time achieving a very small gap between rotor and stator, preferably around 1.5 mm or less. Moreover injection moulding per se has difficulty in fabricating a radial wall with the desired thinness without substantial risk of perforations, weld lines, and similar faults.

SUMMARY OF THE INVENTION

According to the invention there is therefore provided a method of manufacturing a housing for the stator of an axial flux permanent magnet machine, the machine having a stator comprising a set of coils wound on respective stator bars and disposed circumferentially at intervals about an axis of the machine, and a rotor bearing a set of permanent magnets and mounted for rotation about said axis, and wherein said rotor and stator are spaced apart along said axis to define a gap therebetween in which magnetic flux in the machine is generally in an axial direction, the method comprising: fabricating a radial wall for said stator housing to be located in said gap between said rotor and said stator by: placing a membrane of a fibre-reinforced resin into a mould of an injection moulding machine; injection moulding a set of reinforcing features onto said membrane using a thermoplastic polymer bondable when molten with said fibre-reinforced resin; and manufacturing said housing using said radial wall.

As previously mentioned, it is preferable for the gap in the machine to be as small as practicable and it is therefore preferable that the membrane is as flat as possible. However thermal effects make this difficult and in practice the region of the membrane between the reinforced ribs tends to form a dome-shaped bubble of at least a few tens of μm in height. In embodiments, therefore, the membrane is selected such that it has an in-plane coefficient of thermal expansion which is greater than that of the injected thermoplastic polymer (at the same temperature, when the polymer is set). By controlling TCE in this way the aim is for the membrane to be stretched flat on cooling, since the membrane will contract more than the reinforcing features. In practice, however, the membrane may not reach the same temperature as the injection moulded reinforcing material and thus this approach may be only partially successful.

Thus in some preferred embodiments it may also be preferable to perform the injection moulding by clamping the membrane in the mould, heating the membrane (this may comprise simply allowing the membrane to heat within the mould), and then briefly unclamping and re-clamping the membrane to allow the sheet to expand, prior to injecting the thermoplastic for the reinforcing features. Preferably the mould is held at a temperature of greater than 140° C. or 150° C. The mould may then heat the membrane; this also has the advantage that the incoming thermoplastic polymer does not freeze too quickly.

A stator bar in embodiments comprises a pole piece around which the coil is wound, with a pole shoe at either end to spread the field where it crosses the air gap, the increased area reducing the overall reluctance of the gap. In embodiments of the method the stator bars may be bonded to the membrane prior to forming the reinforcing features. In embodiments this may be performed by heating the stator bars, for example by induction heating, and pressing the bars into the membrane (although in principle the membrane could be made mouldable in other ways, for example using a solvent). This allows a very accurate control of the thickness of the membrane between the ends (shoes) of the stator bars and the air gap; this thickness may be in the range 1-500 μm.

Advantageously the fibre-reinforcement of the membrane inhibits the stator bars from pushing through the membrane even when the thickness is very small. However this is not essential and a membrane without fibre-reinforcement may be employed with careful control of the pressing process. In still other approaches the membrane may be provided with a set of apertures into which the faces of the ends/shoes of the stator bars fit, flush with the far side of the membrane. The ends/shoes may be provided with a flange or step around the edge of the exposed face, which may then be bonded with the membrane surface on which it sits. Optionally one or more additional laminations may be formed over the end/shoes, to retain them in place within the radial wall of the machine.

Usefully it has been found experimentally that where a stator bar/pole piece/shoe is formed from soft magnetic composite (SMC) material—that is a powdered magnetic material such as iron, bonded with a coating of electrically insulating material such as glass—a very strong bond is formed between the SMC stator bar and membrane. It is believed (without wishing to be bound by theory) that this is due to diffusion of polymer into the stator bar, which exhibits some porosity—a bond formed in this way is stronger than the SMC itself.

The stator bars may be positioned on the membrane using a template. Once they have been bonded into place the assembly can be picked up magnetically. It is then preferably injection moulded with the membrane substantially horizontal (using a vertical tool) so that the membrane sits flat during the injection moulding process. The stator bars themselves may then provide a portion of the shut-off of the mould cavity. In embodiments the fibre-reinforced resin may comprise a fibre-reinforced thermoplastic polymer miscible when molten with said thermoplastic polymer used to form the reinforcing features, or it may comprise, a thermosetting material for example of the type used for prepreg, say, in the manufacture of printed circuit boards.

Preferably the, injection moulded polymer is also fibre-reinforced (with short fibres, for example of order length 1 mm or less, to facilitate flow); these may be of the same materials as previously described. The thermoplastic polymer may be, for example, a high temperature thermoplastic injection moulded resin such as PEEK or PPA. The machine may operate at an elevated temperature in use, and in some preferred embodiments of the method an in-plane coefficient of thermal expansion of the membrane of fibre-reinforced polymer matches a coefficient of thermal expansion of the reinforcing feature (in the same direction or plane) to within 8 ppm, and preferably also matches the coefficient of thermal expansion of the end (shoe) of a stator bar (in the same direction or plane) to within 5 ppm. This may be achieved by routine experiment, selecting from amongst available polymer materials. In embodiments the polymer of the membrane forming the thin-walled section of the housing may comprise one or more off the following high temperature thermoplastic polymers: PPS (polyphenylene sulfide), PPA (polyphthalamide), PEEK (polyether ether ketone), ABS (acrylonitrile butadiene styrene), and PA (polyamide). However the temperature coefficient of expansion is less important than the stiffness, and preferably an in-plane Young's modulus of the membrane is less than 50 GPa and more preferably less than 20 GPa.

The membrane can be very thin, for example less than 1 mm or less than 0.5 mm thickness; preferably it is fibre-reinforced. In embodiments the reinforcing fibre may be a plain weave fibre (the weft goes over one warp and under the next). In embodiments the fibre is calendared (treated with pressure/heat between rollers) as this helps to achieve a uniform, thin, membrane thickness. The fibres may comprise, for example, glass, carbon, basalt, or aramid.

The reinforcing features may comprise radial and/or annular (circumferential) ribs. In some preferred embodiments the reinforcing features define a set of cavities each sized to fit the shoe at the end of a stator bar. Preferably the membrane of polymer is heated prior to the injection moulding, either prior to insertion or in-situ once inserted in the moulding machine, for improved adhesion between the ribs and membrane and also to provide some thermal expansion of the membrane prior to injection moulding. In embodiments the thickness of a rib (above the thin membrane) is 3 mm or greater whilst the membrane thickness, as previously mentioned, is less than 1 mm, preferably less than 0.5 mm. Thus the majority of the narrow rotor-stator gap "G" is "air".

Embodiments of the techniques we have described are particularly useful for a yokeless and segmented armature machine, in particular a motor, because they facilitate accurate positioning and support of the stator segments in the absence of a yoke, in particular when the machine is under load. In embodiments the machine may be a motor or generator. Preferably the stator housing comprises a pair of radial walls, one at either end of the stator, linked via a generally cylindrical section. This cylindrical portion may be fabricated from metal, for example aluminium, but in embodiments is preferably injection moulded together with the reinforcing ribs of the radial wall. Thus in embodiments a radial wall and a portion of the length of the cylindrical wall forms a clamshell. Two clamshells may mate to provide a closed chamber, or cavity, for the stator within which coolant, for example oil, may be circulated.

BRIEF DESCRIPTION OF THE DRAWINGS

These and other aspects of the invention will now be further described, by way of example only, with reference to the accompanying figures in which.

DETAILED DESCRIPTION OF PREFERRED EMBODIMENTS

Figure 1A:
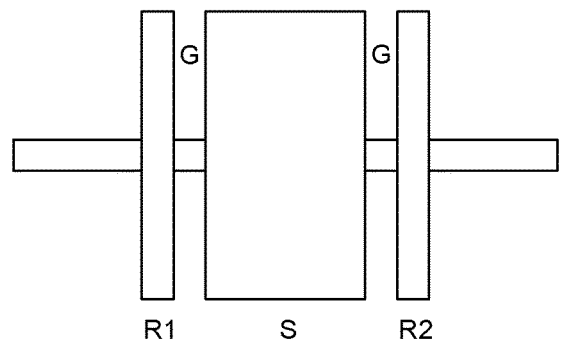
FIGS. 1a to 1c show, respectively, a general configuration of a two-rotor axial flux machine, example topologies for axial flux permanent magnet machines, and a schematic side view of a yokeless and segmented armature (YASA) machine.
Figure 1B:
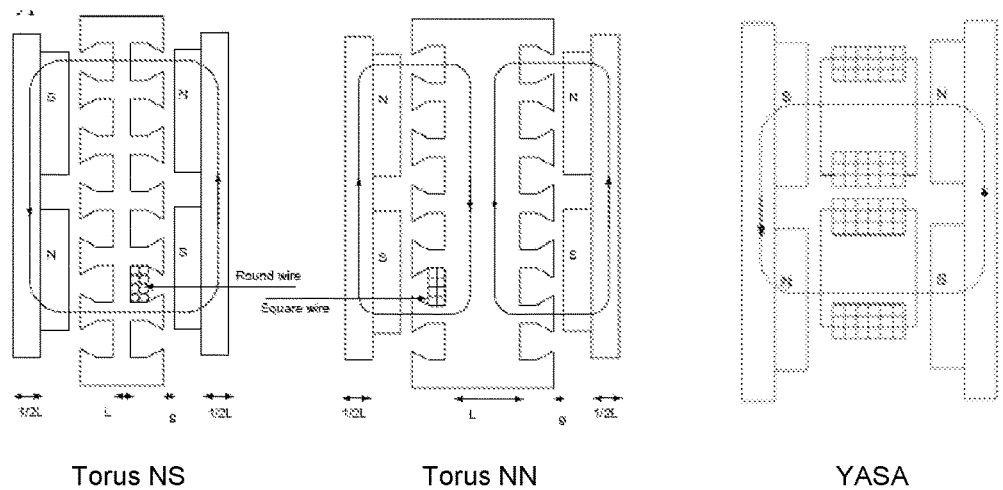
Figure 1C:
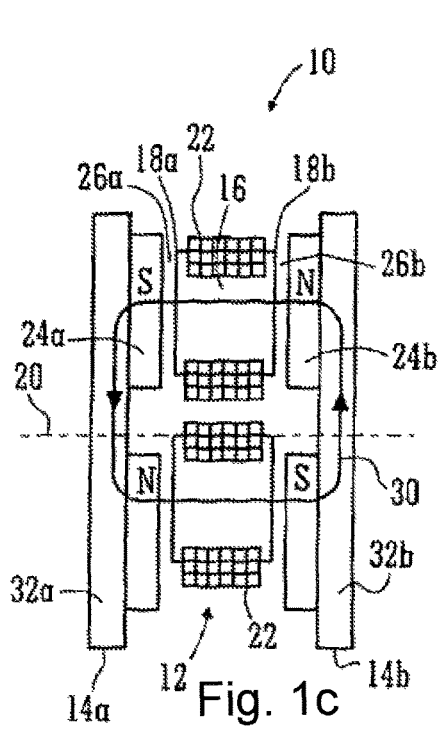
Figure 2:
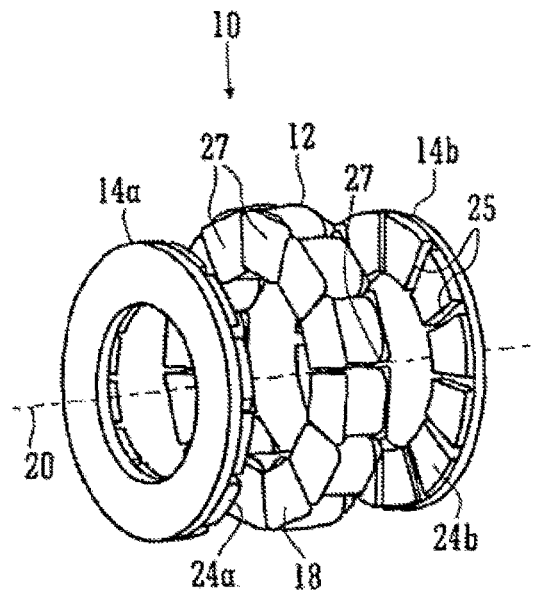
FIG. 2 shows a perspective view of the YASA machine of FIG. 1c.
Figure 3:
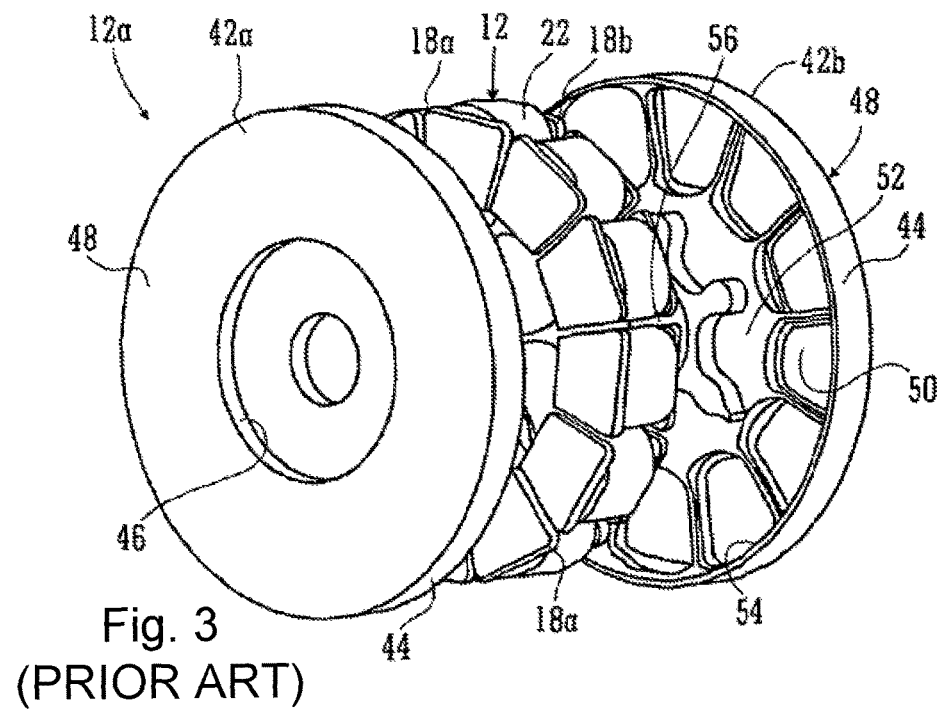
FIG. 3 shows a perspective exploded view of a stator and stator housing for a YASA machine according to the prior art.

Referring first to FIGS. 1c, 2 and 3, which are taken from our PCT application WO2012/022974, FIG. 1c shows a schematic illustration of a yokeless and segmented armature machine 10.

The machine 10 comprises a stator 12 and two rotors 14a,b. The stator 12 is a collection of separate stator bars 16 spaced circumferentially about a rotation axis 20 of the rotors 14a,b. Each bar 16 has its own axis (not shown) which is preferably, but not essentially, disposed parallel to the rotation axis 20. Each end of each stator bar is provided with a shoe 18a,b which serves a physical purpose of confining a coil stack 22, which stack 22 is preferably of square/rectangular section insulated wire so that a high fill factor can be achieved. The coils 22 are connected to an electrical circuit (not shown) that, in the case of a motor, energizes the coils so that the poles of the resultant magnetic fields generated by the current flowing in the coils is opposite in adjacent stator coils 22.

The two rotors 14a,b carry permanent magnets 24a, b that face one another with the stator coil 22 between (when the stator bars are inclined—not as shown—the magnets are likewise). Two air gaps 26a, b are disposed between respective shoe and magnet pairs 18a/24a, 18b/24b. There are an even number of coils and magnets spaced around the axis of rotation 20 and, preferably, there are a different number of coils and magnets so that the coils do not all come into registration with the corresponding magnet pair at the same time and at the same rotational position of the rotor with respect to the stator. This serves to reduce cogging.

In a motor the coils 22 are energized so that their polarity alternates serving to cause coils at different times to align with different magnet pairs, resulting in torque being applied between the rotor and the stator. The rotors 14a,b are generally connected together (for example by a shaft, not shown) and rotate together about the axis 20 relative to the stator 12. The magnetic circuit 30 is provided by two adjacent stator bars 16 and two magnet pairs 24a,b and a back iron 32a,b for each rotor links the flux between the back of each magnet 24a,b facing away from the respective coils 22. The stator coils 16 are enclosed within a housing that extends through the air gap 26a, b and which defines a chamber supplied with a cooling medium.

Turning to FIG. 3, a stator 12a is shown in which the stator coils are located between plastics material clam shells 42a, b. These clamshells have external cylindrical walls 44, internal cylindrical walls 46, and annular radially disposed walls 48. In the prior art example of FIG. 3 the radial walls 48 include internal pockets 50 to receive the shoes 18a,b of the stator bars 16 and serve to locate the stator coil assemblies 16, 22, 18a,b when the two clam shell housings 42a, b of the stator 12a are assembled together. The stator housing 42a, b defines spaces 52 internally of the coils 22 and externally at 54 around the outside of the coils 22 and there are spaces 56 between the coils. The spaces 52,54,56 are interlinked defining a cooling chamber. Although not shown in FIG. 3, when assembled, the stator housing 42a,b is provided with ports that allow cooling medium such as oil to be pumped into the spaces 52,54,56 to circulate around the coils and cool them.

The coil cores may be laminated with the inter-lamination insulation parallel to the desired flux direction. However the coil cores may also be formed from soft-iron particles coated with electrical insulation and moulded to a desired shape (soft magnetic composites—SMC), being bound together by the insulation matrix. An example SMC may comprise glass-bonded iron particles, a thin layer (typically<10 µm) of glass bonding and mutually electrically insulating the iron particles, leaving some residual porosity. A high-temperature, high-pressure compaction process is used to mould the component into a complex shape, capable of producing three-dimensional magnetic flux patterns with an excellent form factor and enabling a high fill factor winding to be employed, wound straight onto SMC teeth. Conveniently the shoes and stator bar may be formed separately and subsequently assembled; a shoe may have a central region with an axial direction of minimum reluctance and an outer region with a radial direction of minimum reluctance (see WO2012/022974).

Figure 4A:
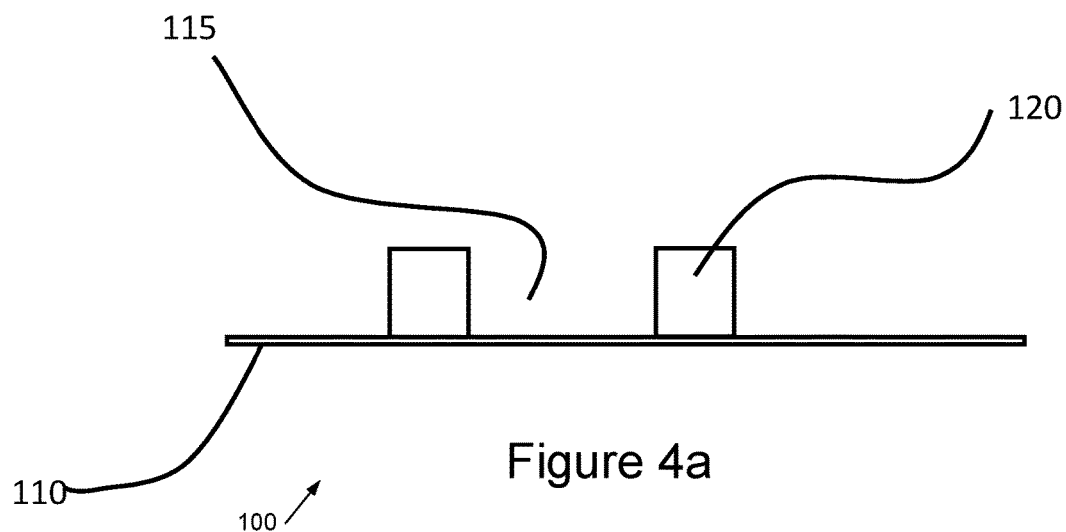
FIGS. 4a and 4b show, respectively, a vertical cross-section view and a view from above of an annular radial wall of a stator housing according to an embodiment of the invention.
Figure 4B:
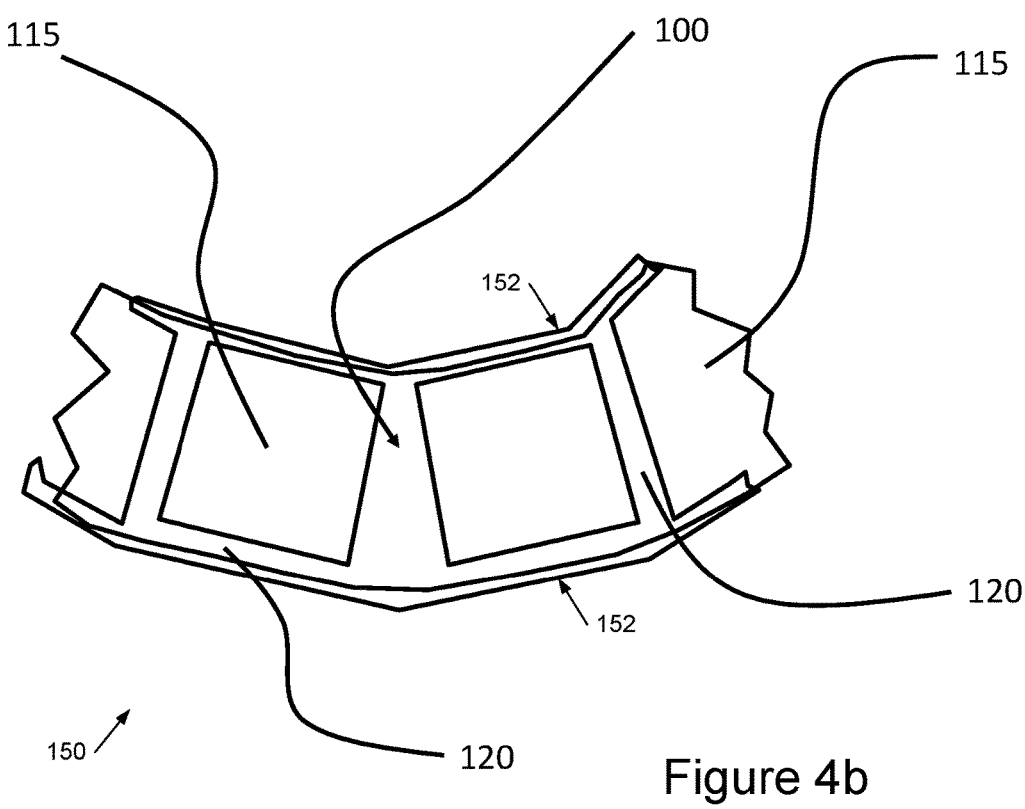

Referring to FIG. 4a, this shows, schematically, a vertical cross-section through the annular, radial wall 100 of an injection moulded stator housing according to an embodiment of the invention. This comprises a thin, reinforced membrane 110 of thermoplastic material onto which has been moulded a set of radial and circumferential reinforcing ribs 120, leaving cavities 115 therebetween to accept shoes of the pole pieces. FIG. 4b shows the same arrangement from above, showing and axial view of one half of a clamshell-type stator housing 150, also illustrating the cylindrical walls 152 of the housing.

Figure 5:
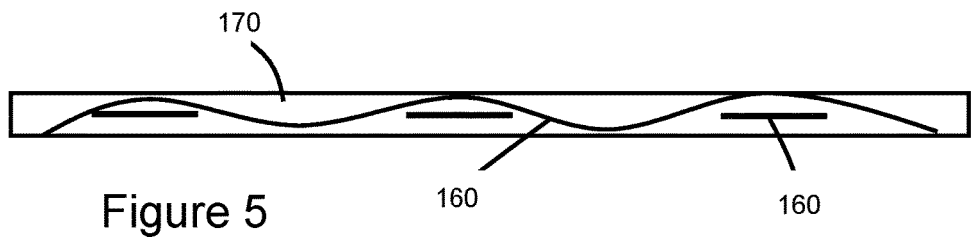
FIG. 5 shows a vertical cross-section through a membrane of fibre-reinforced polymer for use in manufacturing the radial wall of FIG. 4.

FIG. 5 illustrates the membrane of fibre-reinforced thermoplastic starting material in cross-section. This illustrates plain weave reinforcing fibre 160 within the material, impregnated with a thermoplastic resin 170, and calendared to form a uniform thickness membrane. Preferably resin 170 is an "engineering polymer" which is relatively strong at high temperature, for example PPA or PEEK; the glass fibre reinforcement helps to confer toughness and strength. A suitable material (0.5±0.05 mm thick and compatible with injection moulding is readily available from various materials suppliers.

A process for forming the housing 150, more particularly radial wall 100, comprises inserting this into a mould tool and shutting off the tool so as to form radial and circumferential ribs, preferably at least 3 mm thick. These may be formed using a thermoplastic polymer compatible with that of the thin thermoplastic membrane, the ribs being intimately bonded to the membrane during the injection moulding process.

Preferably the membrane is selected so that an in-plane temperature coefficient expansion (TCE) of the material is greater than that of the (isotropic) TCE of the rib material at the same temperature, for example 20° C. The TCE of the membrane depends, in part, on the fibre weave whether this is plane weave or twill, whether the fibres are at 90° or 45° to one another and so forth. For example a plain weave membrane (which may comprise, for example, PA6 and/or PA66) may have a TCE in one in-plane direction of $14 \times 10^{-6}$ m/° C. and $29 \times 10^{-6}$ m/° C. in a perpendicular direction, whilst the TCE of the rib material may be of order $11 \times 10^{-6}$ m/° C. (For comparison the soft magnetic composite may have a TCE of order $13 \times 10^{-6}$ m/° C.). In this way when the combination of the membrane and ribs cools, the membrane contracts more than the ribs and is pulled flat. Ideally, therefore, the greater the difference in TCE between the membrane and rib material the greater this effect, although there may be other materials concerns to take into account. In practice the rib material may be injected at around 340° C. and may solidify at around 320° C. giving the membrane little time to heat up. In practice therefore a small 'bubble' in the membrane may remain between the ribs although this technique, in embodiments, enables the membrane to be kept flat to within around a few hundred microns.

In embodiments the injection moulding process is modified so that, initially the tool parts (mould) is clamped and the membrane heated (or allowed to heat up), and then the tool is briefly unclamped, for example for around a second, to allow the membrane to expand, and then the tool is re-clamped and the thermoplastic polymer injection moulded. This also helps to achieve a flat surface for the housing wall adjacent the air gap, thus facilitating a reduction in the air gap.

The incoming material freezes very quickly, for example in well under a second, so is preferably injected quickly at a high pressure (some 10 s of bar) using a large gate size, afterwards packing to fill any remaining coring. In embodiments, to lengthen the time before the injected material freezes, the mould is preferably held at a relatively high temperature, for example of order 150° C., for example using temperature-controlled oil.

In a production process the pole pieces/shoes may initially be bonded to the membrane, using a template to hold them in place, heating the SMC by induction. The resulting structure needs to be handled carefully, and may be picked up magnetically and placed into a vertical tool/mould in which the membrane sits flat. In embodiments the mould and stator bars work together to provide shut-off of the mould.

In a preferred approach, rather than split a stator bar in the middle, one part of a stator bar comprises the pole piece and the shoe and the other part a shoe for the other end which abuts the pole piece when the motor is assembled, after a coil has been positioned over the pole piece. Thus one membrane may bear a shoe—pole piece combination, and the other just a shoe. The two membranes are assembled with cylinders, for example of aluminium or plastic, forming the side walls to provide a closed cavity (apart from coolant ducts and electrical connections). The overall box structure which results is very strong when assembled, in part because there is a very large surface area bonding the shoes to the membrane.

Figure 6A:
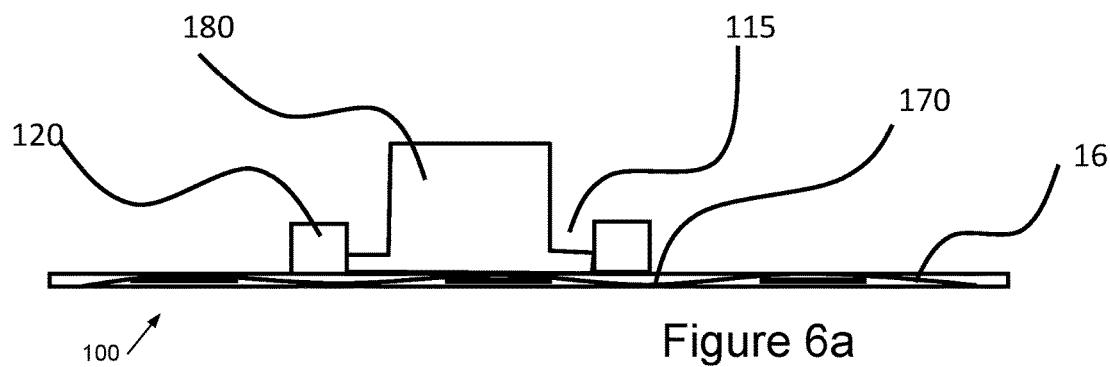
FIGS. 6a and 6b show, respectively, the radial wall of FIG. 5 with a stator pole piece attached, and the radial wall of a stator piece with a supplementary resin film aiding gap filling.

FIG. 6a illustrates the radial wall 100 of FIG. 4 with a stator pole piece 180 bonded into place: the stator pole piece 180 is heated and pressed into the thin membrane 110 but the reinforcement (for example of glass fibre) acts as an end stop. This prevents the stator pole piece from pushing through the very thin membrane and maintains, inter alia, the liquid-proof integrity of the housing for containing coolant oil when in use. Nonetheless, fibre reinforcement is not essential for membrane 110 and, instead, push-through of the stator pole piece 180 may be inhibited by careful control of the pressing of the stator pole piece and/or use of a suitable stop.

Advantageously it has also been found that the relatively small quantity of thermoplastic polymer 170 in the thin membrane 110 is sufficient to form an exceptionally strong bond to SMC pole pieces. However in a related aspect of this process the bonding tends to remove resin from the membrane leaving the fibres apparent on the opposite surface of the membrane, which may no longer be smooth. This can be addressed by including a thin supplementary membrane between the fibre-reinforced membrane and the shoes of the pole pieces, preferably of the same type of resin as the fibre-reinforced membrane, to act as a supplementary resin supply. This also has the advantage that reduced flatness of the shoe faces and/or fibre-reinforced membrane can be accommodated.

Figure 6B:
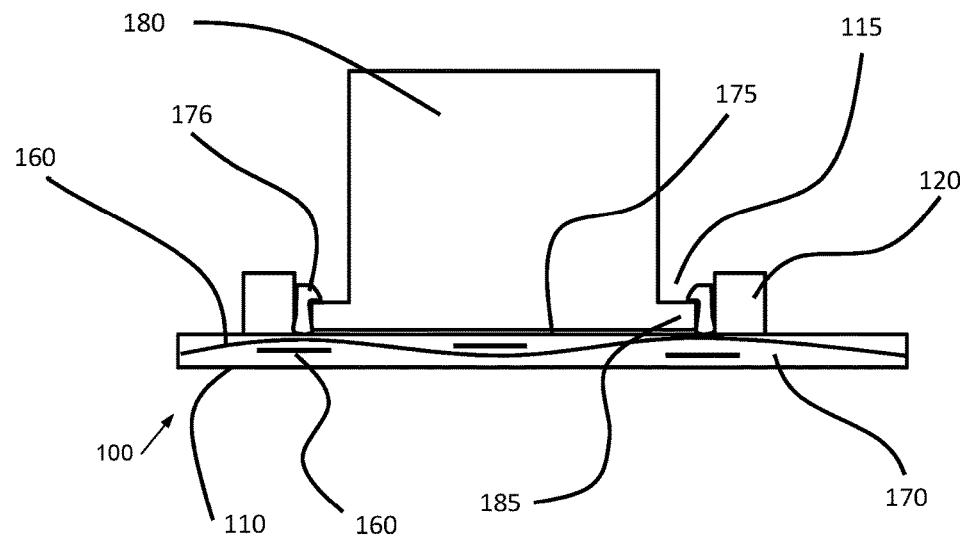

FIG. 6b shows a variant of the structure of FIG. 6a incorporating a supplementary thermoplastic polymer membrane 175 of a compatible resin to resin 170 of membrane 110. This supplementary membrane 175 may have a thickness of order ~0.25 mm, and provides space filling for any unevenness of substrates 180 and 110 and flashing 176 when pole piece 180 is heated and pressed into thin membranes 175 and 110. This flashing helps to augment bonding of the pole shoes and also fills tolerance gaps between ribs 120 and pole shoes 185. The underlying glass reinforcement still prevents push-through when heating the pole shoes, placing these on the unheated thin membrane, and pressing firmly, and the resulting bond strength is stronger than the SMC itself. Preferably the end surface of the stator bar is clean i.e. free from organic residue and may be cleaned, for example by brushing or using an acid etch, to improve the surface porosity prior to bonding.

This technique facilitates accurate control of the thickness of membrane between the end (shoe) of a stator bar and the air gap. In addition the resulting structure has a very thin radial wall, as desired, oil integrity, the useful function of holding the pole pieces in their correct relative positions during assembly and, when the structure is fully assembled, provides great strength. As previously described in our WO2012/022974, where a clamshell-type approach is employed the stator bars/pole pieces may be split at some point along their length so that one shoe/stator bar can be attached to each clamshell prior to joining the clamshells and stator bars. Alternatively the stator bars may be assembled onto one clamshell and then the second joined to the first and bonded to the stator bars at the same time, avoiding the need to split the stator bars for a stronger structure.

Optionally a reinforcing feature or rib may be fabricated from a plurality of lamina, compressed and heated together to mutually bond. Preferably each lamina is fibre reinforced so that the weave extends through substantially the entire radial wall, that is both through the membrane and its reinforcement. Optionally the direction(s) of weave may differ from one lamina to the next.

Figure 7A:
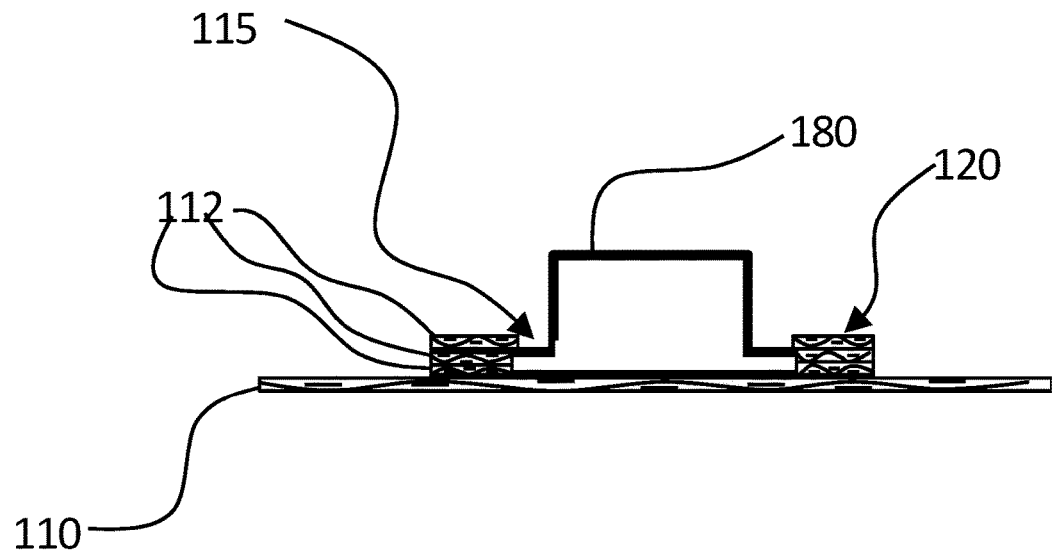
FIGS. 7a to 7c show, respectively, first and second example cross-sections through a radial wall employing laminated reinforcing features, and an exploded 3D view of the laminated reinforcing features prior to assembly.
Figure 7B:
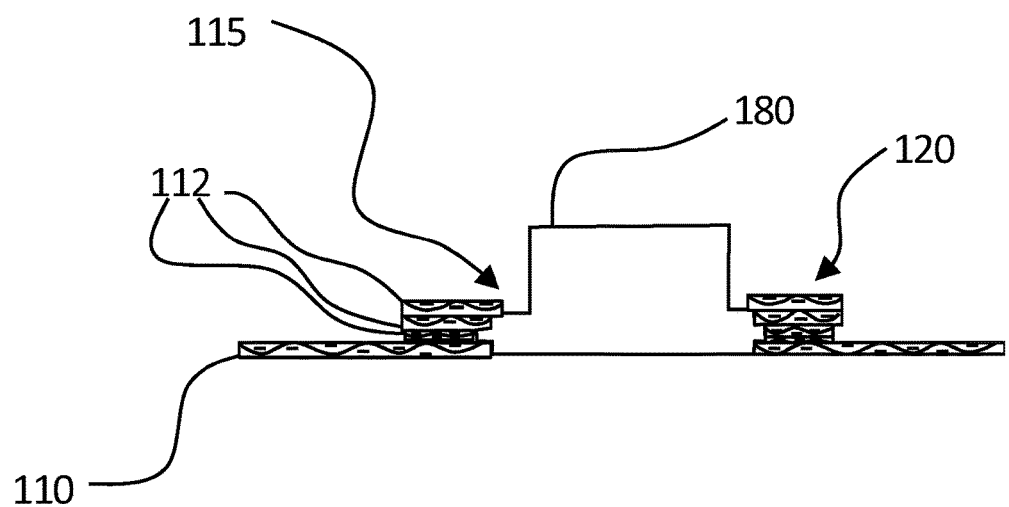
Figure 7C:
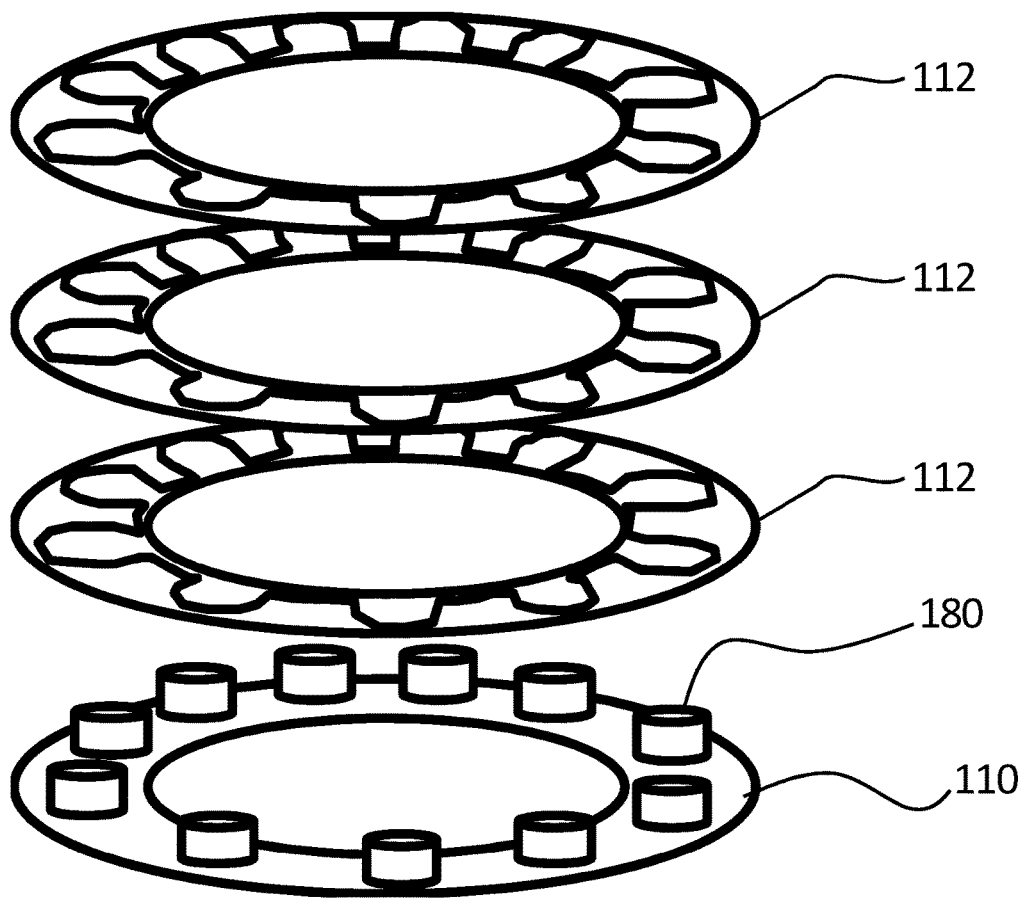

FIG. 7a shows a cross-section through a radial wall fabricated in this way, showing the lamina 112. In FIG. 7a the whole end face of a stator bar, more particularly the show, bonds to the membrane 110. Alternatively, as shown in FIG. 7b, the end face or shoe of a stator bar may fit into an opening in the membrane. In this case the end face or shoe may be provided with a step as illustrated to facilitate bonding to the underlying membrane. Optionally in either case one or more of the lamina may overlay a step or flange of the shoe as shown. FIG. 7c illustrates the lamina 112 in an exploded 3D view.

Figure 8:
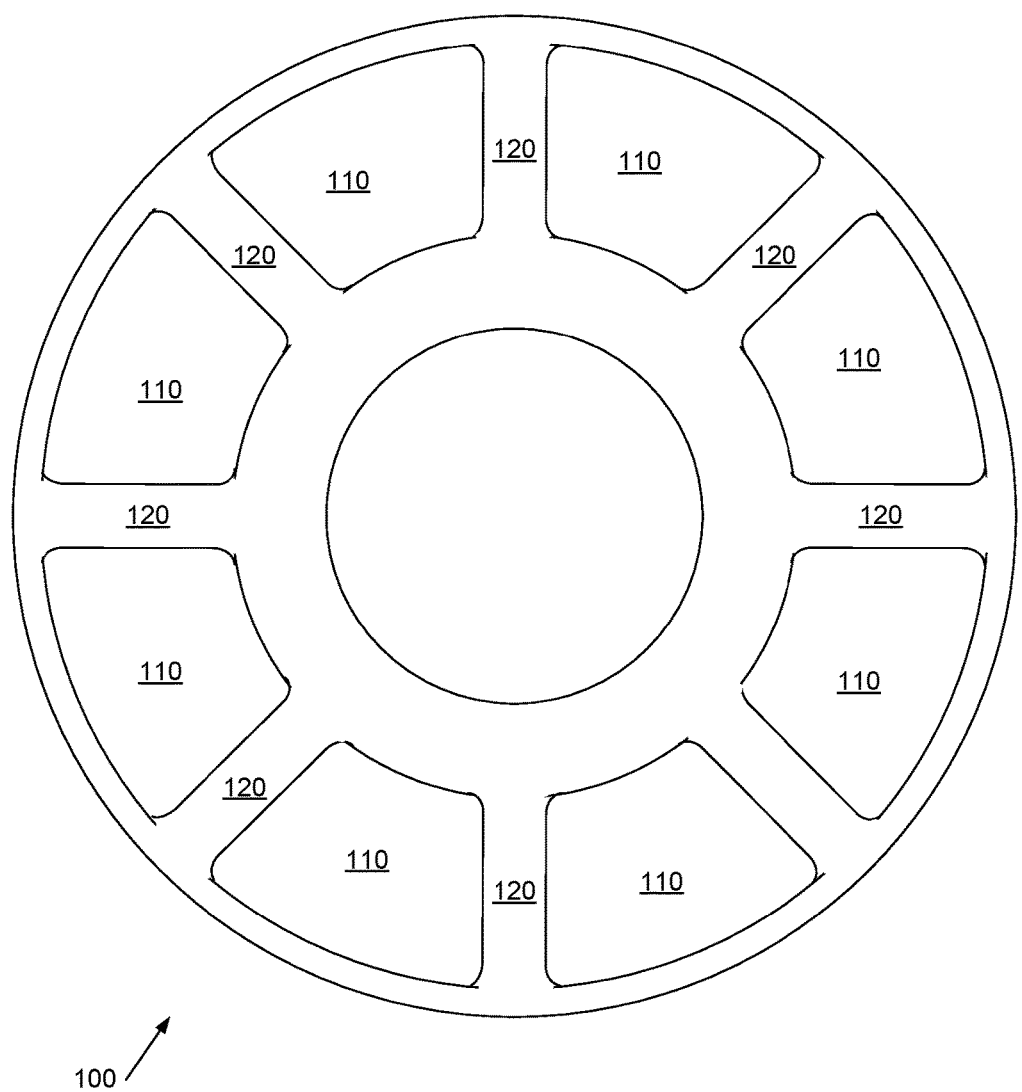
FIG. 8 shows a schematic illustration of a radial wall for an axial flux permanent magnet machine, manufactured using a process according to an embodiment of the invention.

FIG. 8 shows a schematic illustration of a radial wall 100 for a YASA motor manufactured using the above described process. The membrane 110 is substantially flat between reinforcing ribs 120; the shoes of the pole pieces fit in the regions 110 where the membrane is seen.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A method of manufacturing a housing for the stator of an axial flux permanent magnet machine, the machine having a stator comprising a set of coils wound on respective stator bars and disposed circumferentially at intervals about an axis of the machine, and a rotor bearing a set of permanent magnets and mounted for rotation about said axis, and wherein said rotor and stator are spaced apart along said axis to define a gap therebetween in which magnetic flux in the machine is generally in an axial direction, the method comprising:
- fabricating a radial wall for said stator housing to be located in said gap between said rotor and said stator by:
- placing a resin membrane into a mould of an injection moulding machine;
- injection moulding a set of reinforcing features onto said membrane using a thermoplastic polymer bondable when molten with the resin of said membrane; and
- manufacturing said housing using said radial wall.

2. A method as claimed in claim 1 further comprising selecting said membrane and said thermoplastic polymer such that an in-plane coefficient of thermal expansion of said membrane is greater than a coefficient of thermal expansion of said thermoplastic polymer when set.

3. A method as claimed in claim 1 wherein said injection moulding comprises:
- clamping said membrane in said mould;
- heating said membrane;
- unclamping said membrane to allow said membrane to thermally expand;
- re-clamping said membrane; and
- injecting said thermoplastic polymer into said mould.

4. A method as claimed in claim 3 further comprising holding said mould at a temperature of greater than 100° C.

5. A method as claimed in claim 1 further comprising heating said membrane prior to said injection moulding.

6. A method as claimed in claim 1, wherein said resin membrane comprises a fibre-reinforced polymer, the method further comprising controlling a thickness of said gap by:
- pressing a set of said stator bars into said fibre-reinforced polymer membrane whilst said membrane is mouldable; and
- solidifying said fibre-reinforced polymer membrane to hold said set of stator bars in their respective positions.

7. A method as recited in claim 6 further comprising providing a supplementary membrane between said stator bars and said fibre-reinforced polymer membrane prior to said pressing and solidifying.

8. A method as recited in claim 6 further comprising heating said stator bars to make said polymer of said membrane mouldable.

9. A method as claimed in claim 6 comprising attaching said stator bars prior to said injection moulding and performing said injection moulding with said membrane horizontal.

10. A method as claimed in claim 1 wherein said resin membrane comprises a first fibre-reinforced thermoplastic polymer, and wherein said thermoplastic polymer comprises a second thermoplastic polymer miscible when molten with said first thermoplastic polymer.

11. A method as claimed in claim 10 wherein said second thermoplastic polymer is fibre-reinforced with glass fibre, carbon fibre, or aramid fibre.

12. A method as claimed in claim 1 wherein an in-plane Young's modulus of said membrane is less than 50 GPa.

13. A method as recited in claim 1, wherein said membrane has a thickness of less than 1 mm.

14. A method as recited in claim 1 wherein said membrane comprises one or more of PPS, PPA, PEEK, ABS, and PA.

15. A method as claimed in claim 1, wherein a said reinforcing feature has a height of at least 3 mm above a plane of said membrane.

16. A method as claimed in claim 1, wherein a said stator bar has a shoe at least at one end, and wherein said set of reinforcing features defines a set of cavities for said shoes of said stator bars.

17. A method as claimed in claim 1 wherein said machine is a yokeless and segmented armature machine having a pair of said rotors, one to either side of said stator, wherein said housing has a pair of said radial walls, one between said stator and each respective rotor, connected by a generally cylindrical wall, wherein said housing defines a chamber for coolant for said coils of said stator, and wherein said radial walls with said reinforcing features hold said stator bars in position during operation of said machine.

18. A method of manufacturing an axial flux permanent magnet machine, the machine having a stator comprising a set of coils wound on respective stator bars and disposed circumferentially at intervals about an axis of the machine, and a rotor bearing a set of permanent magnets and mounted for rotation about said axis, and wherein said rotor and stator are spaced apart along said axis to define a gap therebetween in which magnetic flux in the machine is generally in an axial direction, the method comprising manufacturing a housing for the stator of the machine as recited in claim 1, and using said housing to hold said set of stator coils in place in the machine.

19. A method as claimed in claim 12 wherein the in-plane Young's modulus of said membrane is less than 20 GPa.

20. A method as recited in claim 13, wherein said membrane has a thickness of less than or equal to 0.5 mm.

* * * * *